No. 726,336.　　　　　　　　　　　　　　　　PATENTED APR. 28, 1903.
A. J. OTT.
SHAFT COUPLING.
APPLICATION FILED JUNE 20, 1902.
NO MODEL.
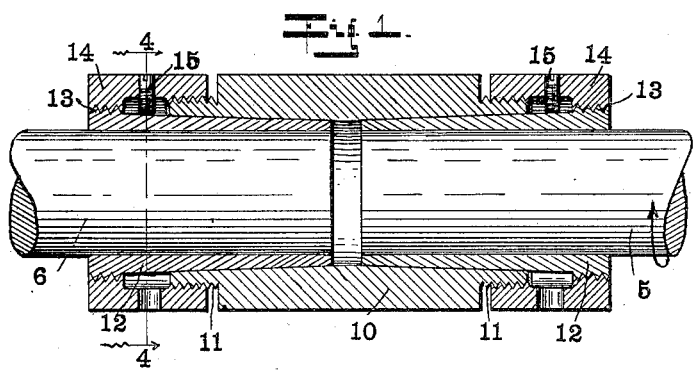
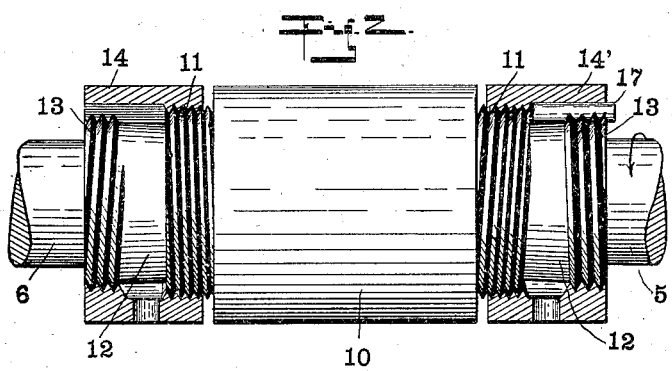
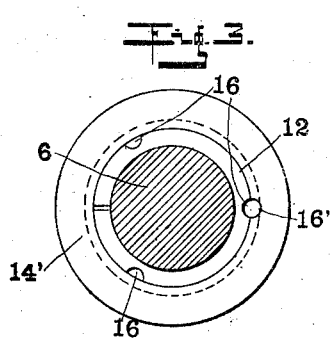
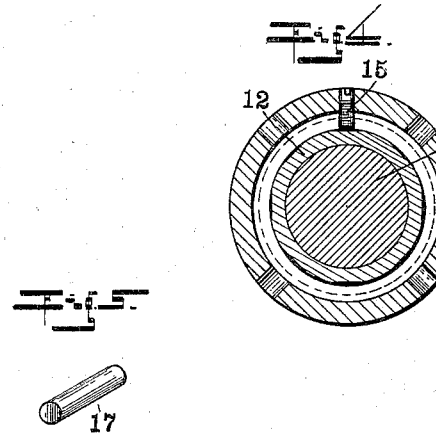
Witnesses
Frank R. Fahle
J. A. Walsh
Inventor
Albert J. Ott
By
Bradford Hood
Attorneys

UNITED STATES PATENT OFFICE.

ALBERT J. OTT, OF INDIANAPOLIS, INDIANA.

SHAFT-COUPLING.

SPECIFICATION forming part of Letters Patent No. 726,336, dated April 28, 1903.

Application filed June 20, 1902. Serial No. 112,473. (No model.)

*To all whom it may concern:*

Be it known that I, ALBERT J. OTT, a citizen of the United States, residing at Indianapolis, in the county of Marion and State of Indiana, have invented certain new and useful Improvements in Shaft-Couplings, of which the following is a specification.

My invention relates to an improvement in that class of shaft-couplings described and claimed in Patent No. 655,136, issued July 31, 1900, to T. F. Vandegrift. In this shaft-coupling the threads on the hub and the coacting bushing are of opposite spirality, and the arrangement is such that when the shaft is turned in one direction any tendency to slip will result in a crowding of the bushing into the hub, so as to increase the frictional contact. On the other hand, if the shaft be turned in the opposite direction there is a tendency to withdraw the bushings, and thus release their grasp upon the shaft.

The object of my present invention is therefore to provide means by which a coupling of this type may be formed so as to be used in coupling-shafts intended to be rotated in either direction, means being provided for connecting the nuts and bushings of the coupling in case the shaft is to rotate in the reverse direction.

A further object of my invention is to so arrange the threaded portions and the means for connecting the nuts and bushings that the same coupling may be used for shafts intended to rotate in either direction, while only one of the nuts will be required to be connected to its adjacent bushing.

The accompanying drawings illustrate my invention.

Figure 1 is an axial section of a coupling constructed in accordance with my invention, the two sections of the shaft being shown in full lines and set-screws being shown as the means for connecting each nut to its bushing. Fig. 2 is a side elevation of another form in which the threads at opposite ends of the coupling are oppositely arranged, the nuts only being shown in section, and a different means for connecting one of the nuts and its adjacent bushing being shown; Fig. 3, an end elevation of the parts shown in Fig. 2; Fig. 4, a section on line 4 4 of Fig. 1. Fig. 5 shows the connecting-pin.

In the drawings, 5 and 6 show the two shaft-sections. The coupling consists of a hub portion 10, which is internally tapered from the center out toward each end and is provided at its ends with threaded portions 11 11. Arranged to fit within each end of the bore of hub 10 is a bushing 12, which is correspondingly externally tapered and provided at its outer end with threads 13. The threads 13 are of opposite spirality to the adjacent threads 11, and a nut 14 is provided at opposite ends with internal threads, adapted to simultaneously engage the threads 11 and 13, and in Fig. 1 each nut carries a set-screw 15, which, if desired, may be brought into engagement with the adjacent bushing 12, so as to positively connect said bushing and nut, and thus require their simultaneous movement. As has been previously stated, the threads 11 and 13 are of opposite spirality, one being right-handed, while the other is left-handed, threads 13 being right and threads 11 being left, or vice versa, but the same at each end of the coupling. For a reason which will appear it may be desirable to arrange the threads as shown in Fig. 2, where the right-hand end of hub 10 is provided with a left-hand thread 11 and the adjacent bushing is provided with a right-hand thread 13, while the left-hand of hub 10 is provided with a right-hand thread 11 and the adjacent bushing 12 with a left-hand thread 13, the coöperating nuts 14' 14' being correspondingly properly threaded. In this form I have shown each bushing 12 provided with peripheral semicircular notches 16, and formed in the nut 14' is a similar peripheral notch 16', so that a comparatively small angular movement of the nut with relation to the bushing may bring notch 16' into register with one or another of the notches 16, so that a pin 17 may be slipped therein, and thus positively connect the bushing and nut.

In operation take the construction shown in Fig. 1 and suppose the threads 13 to be right-hand and threads 11 to be left-hand and the shaft-section 5 to be rotated in the direction indicated by the arrow. If there is any tendency of the adjacent bushing to slip within the hub, it will rotate within the adjacent nut, and because of the right-hand threads of the bushing said bushing will be forced farther and tighter into the hub. If the hub tends to slip upon the bushing which embraces the shaft-section 6, the nut will rotate upon said sleeve and force it farther into the hub. On the contrary, if the same coupling be used where the shaft 5 is driven in the opposite direction any slippage tends to loosen the parts. In such case the set-screws 15 must be set down so as to connect each nut with its bushing where any slippage will tend to crowd the bushings into the hub, the spirality of the threads 11 being opposite to that of the threads 13.

In the form shown in Fig. 2 the operation is slightly modified, because of the change of direction of spirality of the threads 11 and 13 at opposite ends of the coupling. As a consequence, one or the other of the nuts 14' must be connected to its bushing, (but not both,) the bushing having the thread which runs opposite to the direction of driving of the driving-shaft section being the one which must be connected to its nut.

I claim as my invention—

1. A shaft-coupling consisting of, a hub internally tapered from its middle toward each end, and having a thread formed at each end; a pair of compressible bushings each externally tapered to fit within the hub, and provided with a thread opposite in direction from that of the thread on the adjacent end of the hub; a pair of nuts, each provided with a pair of threads fitting the adjacent threads of the hub and bushings; and means by which a nut and bushing may be connected for simultaneous rotation with relation to the hub.

2. A shaft-coupling consisting of, a hub internally tapered from its middle toward each end, and having a right-hand thread formed at one end and a left-hand thread formed at the other end; a pair of compressible bushings externally tapered to fit within the hub, each of said bushings being provided with a thread whose direction is opposite to that of the thread of the adjacent end of the hub; a pair of nuts, each provided with a pair of threads fitting the threads of an adjacent bushing and hub end; and means by which either of the nuts may be connected to its bushing for simultaneous rotation with relation to the hub.

In witness whereof I have hereunto set my hand and seal, at Indianapolis, Indiana, this 17th day of June, A. D. 1902.

ALBERT J. OTT. [L. S.]

Witnesses:
ARTHUR M. HOOD,
JAMES A. WALSH.